Patented Mar. 25, 1952

2,590,536

UNITED STATES PATENT OFFICE 2,590,536

GROUND PARTS OF RYANIA PLANT AS INSECTICIDES

Ralph E. Heal, Elizabeth, N. J., assignor to Merck & Co., Inc., Rahway, N. J., a corporation of New Jersey No Drawing. Application September 14, 1945, Serial No. 616,459

2 Claims. (Cl. 167—24)

This invention relates to insecticidal compositions and particularly to insecticidal compositions containing plant materials from plants of the genus Ryania.

In a pending application, Serial No. 456,203, filed August 26, 1942, now U. S. Patent No. 2,400,295, issued May 14, 1946, in which the applicant is joint inventor, it is disclosed that alkaloidal extracts of plants of the genus Ryania are valuable insecticides; and in another pending joint application of the present applicant, Serial No. 456,202, filed August 26, 1942, now abandoned, it is disclosed that Ryania extracts, when suitably diluted and applied to keratinous fabrics, are excellent mothproofing agents.

It is now found, according to the present invention, that superior material for use in insecticidal dusts and sprays is obtained by merely comminuting, grinding, pulverizing, or otherwise finely dividing various parts such as leaves, stems and roots of plants of the genus Ryania. When the comminuted plant materials are mixed with solid diluents such as powdered talc or with a liquid diluent or carrier such as water, as hereinafter described, dusts and sprays are obtained which are both safe to use and highly effective for insect control.

They are far superior to dusts and sprays containing other plant derived insecticides such as rotenone, nicotine, and the like; and surprisingly they are also superior to dusts and sprays employing Ryania extracts of the type disclosed in application Serial No. 456,203, now U. S. Patent No. 2,400,295, above referred to. The superiority of Ryania plant materials over other plant derived insecticides is due largely to the markedly greater stability of Ryania plant materials to light. This greater stability means in practical terms that the toxicity of Ryania insecticides is more persistent and the protection afforded against feeding attack by insects extends over a considerably longer period.

The light stability of ground Ryania plant materials is also markedly greater than that of Ryania alkaloidal principles such as the extracts and concentrates disclosed in application Serial No. 456,203, now U. S. Patent No. 2,400,295, above noted. Accelerated light exposure tests have been conducted by subjecting to the action of ultraviolet light quantities of ground Ryania plant materials taken from a uniform sample and dusts formed by impregnating talc with extractives from equal amounts of such uniform sample, then preparing alcoholic extracts of both exposed and unexposed samples of the ground material and the impregnated talc, applying these alcoholic extracts to woolen fabrics at uniform rates, exposing the treated fabric to larvae of the webbing clothes moth, and determining, as a measure of insecticidal activity, the weight loss in the various samples due to feeding damage. These tests revealed that ground Ryania plant materials and dusts impregnated with extractives from equivalent amounts of such plant materials have approximately the same insecticidal activity before exposure to ultraviolet light, but that after exposure the activity of the ground material remains substantially unchanged whereas that of the extractives is markedly lower as evidenced by a two to eight-fold increase in the loss of weight in the fabrics due to feeding damage.

The use of ground Ryania plant materials as insecticides has the further advantage that costly extraction procedures and the dangers of handling highly toxic extracts and concentrates are avoided.

Many species within the genus Ryania including, for example, *Ryania speciosa*, *Ryania tomentosa*, *Ryania pyrifera*, *Ryania acuminata*, *Ryania sagotiana*, and *Ryania subuliflora* and the like give materials of high insecticidal activity when plant parts are ground or pulverized. In preparing the pulverized material, dried roots, stems and leaves of individual or mixed species of plants are cut or ground by conventional procedure to a relatively uniform particled mass which is then milled by one or more passes through a ball mill or the like to give a product which will pass through a screen of 200 mesh or finer.

Powdered Ryania plant materials are used to best advantage in insecticidal dusts when mixed with an inert and essentially non-abrasive powder such as talc, bentonite, diatomaceous earth, pyrophyllite, and the like. The inert powder diluent serves the dual purpose of reducing excessive drift in application of the dust, and facilitating the application of required amounts of active materials while avoiding wasteful excess.

It will also be understood that powdered Ryania plant materials can be mixed with other insecticidally active ingredients including plant derived materials such as derris root, cube root, nicotine, pyrethrum, and the like; and synthetic materials such as arsenicals, fluorides, D. D. T. (dichlorodiphenyl trichlorethane) and the like as well as with fungicidal agents such as sulfur, copper containing materials such as Bordeaux mixture and the like. Insecticides containing powdered Ryania plant materials can also include small amounts of activators or extenders such as pine oil, pine oil derivatives, and the like to enhance or promote the activity of the insecticides.

Likewise, powdered Ryania plant materials can be incorporated, either alone or in combination with other insecticidal or fungicidal materials, in liquid media to form excellent insecticidal sprays. For example, powdered Ryania plant material can be suspended in water, water emulsions containing spreading agents, water miscible oils, and the like or in emulsions or suspensions containing insecticidally active materials.

Dusts or sprays containing comminuted Ryania plant material have been tested and are found to be effective in tests with the following species (of the Hexapoda class):

*Table I*

Order Homoptera:
    Apple aphid, *Aphis pomi* (Deg.)
    Potato aphid, *Macrosiphum solanifolii* (Ashm.)
Order Hemiptera:
    Squash bug, *Anasa tristis* (Deg.)
    Milkweed bug, *Oncopeltes fasciatus* (Dallas.)
Order Thysanoptera: Onion thrips, *Thrips tabaci* (Lind.)
Order Coleoptera:
    Japanese beetle, *Popillia japonica* (Newm.)
    Colorado potato beetle, *Leptinotarsa decemlineata* (Say)
    Mexican bean beetle, *Epilachna varivestis* (Muls.)
    Asparagus beetle, *Crioceris asparagi* (L.)
    Elm leaf beetle, *Galerucella xanthomelaena* (Schr.)
    Golden tortoise beetle, *Metriona bicolor* (F.)
    Yellow mealworm, *Tenebrio molitor* (L.)
Order Lepidoptera:
    Imported cabbage worm, *Pieris rapae* (L.)
    Diamond back moth, *Plutella maculipennis* (Curt.)
    Cabbage looper, *Autographa brassicae* (Riley)
    Corn ear worm, *Heliothis armigera* (Hbn.)
    Silkworm, *Bombyx mori* (L.)

In testing ground Ryania plant material against some of the insects mentioned previously, it is found that while the Ryania dust is not always fatally toxic to the insect, it nevertheless affords excellent protection from feeding attacks of the insects on the foliage sprayed or dusted.

It has been found that sprays and dusts containing powdered Ryania plant material are particularly effective in combatting the European corn borer (*Pyrausta nubilalis*) in sweet corn. Extensive field tests have been conducted in areas of New York and New Jersey heavily infested with the European corn borer to determine the effectiveness of powdered Ryania plant material as an agent for controlling this pest when applied at different rates, in different concentrations, and with different carriers. These tests included direct comparisons with untreated areas, and with areas treated with other available insecticides. Representative test conditions and results are illustrated by the following tables.

Table II shows the results obtained in reducing the number of European corn borers in a field of sweet corn in which different sections were treated with ground plant material from various species of Ryania plants, with 1% rotenone, or were untreated. Insecticide applications were first made when most of the sweet corn plantings averaged about 18 to 24 inches in height. The ground Ryania plant material was mixed with about one and one-half parts by weight of talc forming about 40% Ryania dust. Five applications at the rate of about 40–50 lbs. per acre were made at five-day intervals, and at the time of the final application plantings frequently approached their maximum height.

When the plants reached general maturity, i. e., bulk of the ears ready for harvest, representative plants taken from central portions of the various test areas were dissected and a count taken of borers found in the first ear, second ear, and stalk. These results are tabulated in Table II.

*Table II*

| Treatment | Number of borers in 50 plants | | | |
|---|---|---|---|---|
| | 1st Ear | 2d Ear | Stalk | Total |
| *Ryania speciosa* | 1 | 3 | 8 | 12 |
| *Ryania subuliflora* | 3 | 1 | 44 | 48 |
| *Ryania pyrifera* | 2 | 2 | 36 | 40 |
| *Ryania acuminata* | 7 | 2 | 31 | 40 |
| 1% Rotenone Dust | 7 | 2 | 60 | 69 |
| Untreated | 81 | 19 | 314 | 414 |
| | 58 | 10 | 341 | 409 |

Table III shows relative effectiveness of water slurries of Ryania plant material as compared with other insecticidal sprays in controlling damage due to the European corn borer. Sprays were applied by a two-row portable boom equipped with three nozzles per row, and under about 50 pounds' pressure at an average rate of 160–175 gallons per acre per application. The ground Ryania plant material and Cube, containing 4% rotenone, were mixed with water at the rate of 4 pounds per 100 gallons. Nicotine-bentonite, containing 14% nicotine, was prepared at the rate of 3 pounds per 100 gallons. Four applications were made at five-day intervals starting when the plants were about two feet high, and at harvest time plants were selected and dissected to determine borer count as described above. The full-size ears were graded for borer infection, injury, and salability according to the "U. S. Standard for Sweet Corn" established by the Agricultural Marketing Service of the U. S. Department of Agriculture. Only ears grading "U. S. No. 1" or "U. S. Fancy" were considered salable. As tabulated below, the results are given for first generation borers (on early plantings) and second generation borers (on late plantings).

*Table III*

| Sprays used (lb.-gal.) | First Generation | | Second Generation | |
|---|---|---|---|---|
| | Borers per 100 plants | Percent Ears Salable | Borers per 100 plants | Percent Ears Salable |
| Ryania plant material 4-100 | 115 | 97.2 | 62 | 100.0 |
| Cube, 4-100 | 85 | 81.8 | 106 | 89.1 |
| Nicotine Bentonite 3-100 | 156 | 45.7 | 404 | 35.1 |
| Untreated | 725 | 21.6 | 820 | 44.9 |

Table IV shows relative effectiveness of insecticidal dusts containing different amounts of ground Ryania plant material mixed with talc. The tests were conducted by applying the different mixtures at the average rate of 40 pounds per acre for each of four applications at five-day intervals. At harvest, the borer count and grading of full-size ears were effected as above described, and the tabulated results are as follows:

Table IV

| Insecticide Concentration | First Generation | | Second Generation | |
|---|---|---|---|---|
| | Borers per 100 plants | Percent Ears Salable | Borers per 100 plants | Percent Ears Salable |
| 10% Ryania Plant Dust | 192 | 97.1 | | |
| 20% Ryania Plant Dust | 134 | 98.0 | 64 | 100.0 |
| 30% Ryania Plant Dust | 64 | 100.0 | 30 | 84.6 |
| 40% Ryania Plant Dust | 32 | 100.0 | 24 | 89.7 |
| 50% Ryania Plant Dust | 36 | 96.0 | 12 | 94.8 |
| Untreated | 1,119 | 25.2 | 823 | 20.1 |

Table V shows the relative effectiveness of 50% Ryania plant dust in talc when applied at different rates per acre in each of four applications at five-day intervals.

Table V

| Rate per acre per application (lbs.) | Borers per 100 plants | Percent Ears Salable |
|---|---|---|
| 20 | 124 | 100.0 |
| 25 | 70 | 100.0 |
| 30 | 60 | 100.0 |
| 35 | 50 | 100.0 |
| 40 | 32 | 100.0 |
| Untreated | 1,124 | 25.2 |

From a comparison of Tables IV and V of the number of borers per hundred plants and the per cent salable ears, it is apparent that adequate protection against damage due to feeding attack can be obtained without using amounts of the ground Ryania plant material sufficient to kill the greatest number of borers. It will be also understood that for the purpose only of obtaining substantially 100% salable ears it is not necessary that a complete series of four to five applications of insecticidal dust or spray containing ground Ryania plant material be made. It will suffice if one or more applications are made during the period of actual ear formation. The procedure of making four to five applications starting when the plantings are 18 to 24 inches high has the advantage, however, of providing more abundant and larger ears due to the reduction in damage to the plantings by borer feeding prior to ear development.

Field tests have also indicated that ground Ryania plant material is very effective in controlling the oriental fruit moth (*Grapholitha molesta* Busck.) For example, it is found that in spraying mature quince orchards with lead arsenate for three applications at about ten-day intervals followed by about eight treatments with ground Ryania plant material, the percentage of clean fruit is twice that produced on trees given the standard treatment, viz., four applications of lead arsenate followed by six applications of lead arsenate sprays containing a spreading agent at about ten-day intervals.

It will be understood that the foregoing description of tests and tabulations of results obtained with various insecticidal sprays and dusts containing powdered or ground Ryania plant material are given by way of illustration and not of limitation.

Modifications can be made in carrying out the present invention without departing from the spirit and scope thereof, and the invention is to be limited only by the appended claims.

What is claimed is:

1. An insecticidal dust effective in the control of the European corn borer comprising 10% to 50% by weight of ground plant parts selected from the group consisting of leaves, stems, and roots of plants of the genus Ryania in an inert powdered solid carrier.

2. An insecticidal dust effective in the control of the European corn borer comprising 10% to 50% of ground plant parts selected from the group consisting of leaves, stems, and roots of plants of the genus Ryania in pulverized talc.

RALPH E. HEAL.

REFERENCES CITED

The following references are of record in the file of this patent:

UNITED STATES PATENTS

| Number | Name | Date |
|---|---|---|
| 2,400,295 | Folkers et al. | May 14, 1946 |

OTHER REFERENCES

Questel et al.: U. S. D. A. Bureau of Ent. and Plant Quarantine Bulletin E-557 entitled, "Lab. and Field Tests of Toxicity of Some Organic Compounds to the European Corn Borer," December 1941, pp. 1, 14 and 15.

Questel et al.: U. S. D. A. Bureau of Ent. and Plant Quar. Bull. E-620, May 1944, page 1.

Pepper: "A New Plant Insecticide for Control of the European Corn Borer" published February 1945 in Journal of Economic Entomology, vol. 38, pp. 59 through 66.

Chemical Abstracts, vol. 28, published 1934, column 2407, article on "Toxicological Investigations."

Chemical Abstracts, vol. 25, published 1931, page 1332, article entitled "The Active Principles."

Chemical Abstracts, vol. 23, published 1929, page 3050, article entitled "Poisonous Constituents of *Ryania acuminata*."

Baker: "Investigations of Insecticides" published August 1939 in Journal of Economic Entomology, vol. 32, pages 526 through 530.

U. S. Dept. of Agriculture, Bulletin 1201 March 19, 1924.